June 15, 1954  J. H. FRIEDMAN  2,680,860
APPARATUS FOR FORMING HOLLOW ARTICLES
Filed May 3, 1949  12 Sheets-Sheet 1
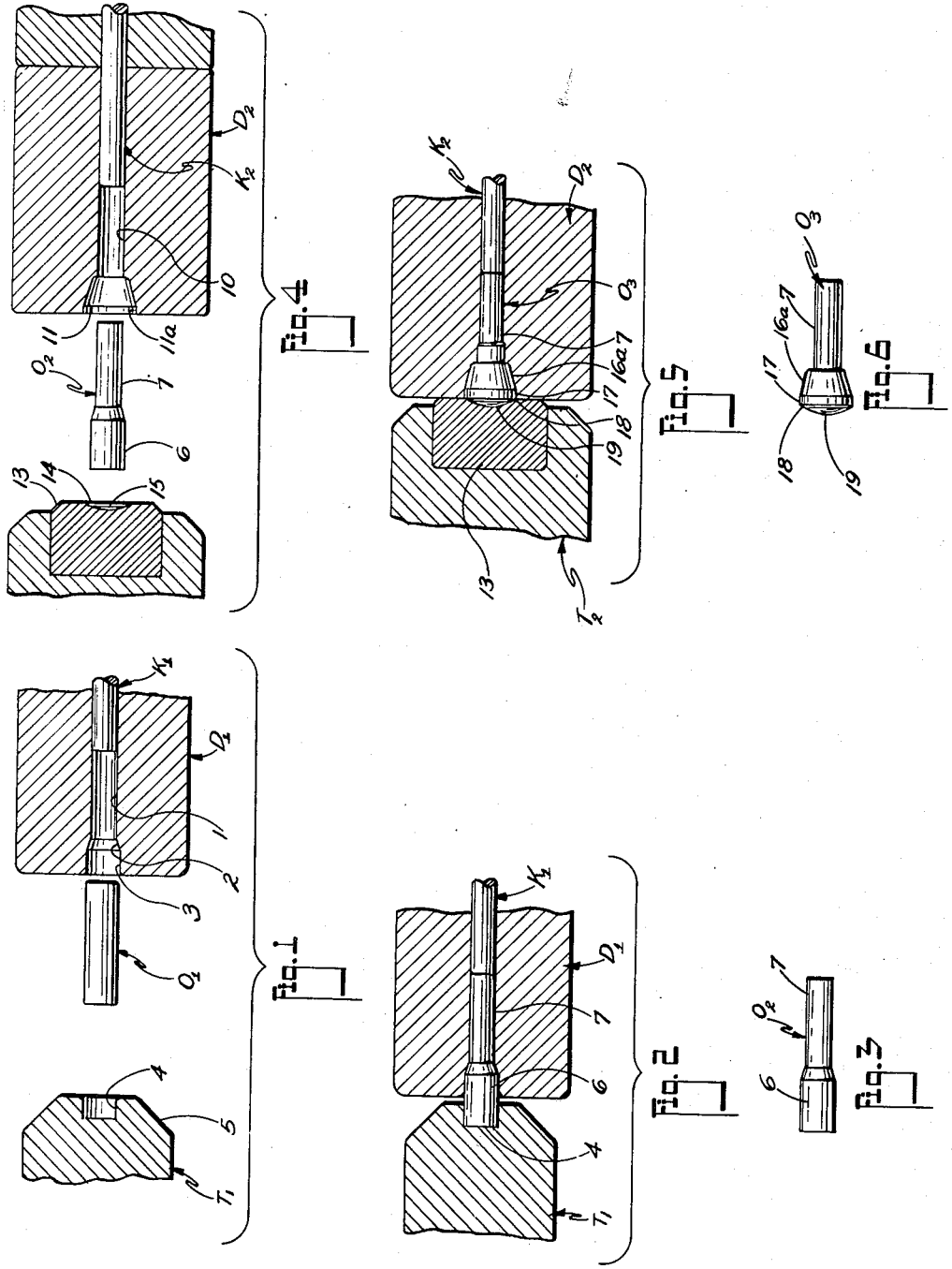
INVENTOR.
JOHN H. FRIEDMAN
BY
RICHEY, WATTS, EDGERTON & McNENNY
ATTORNEYS

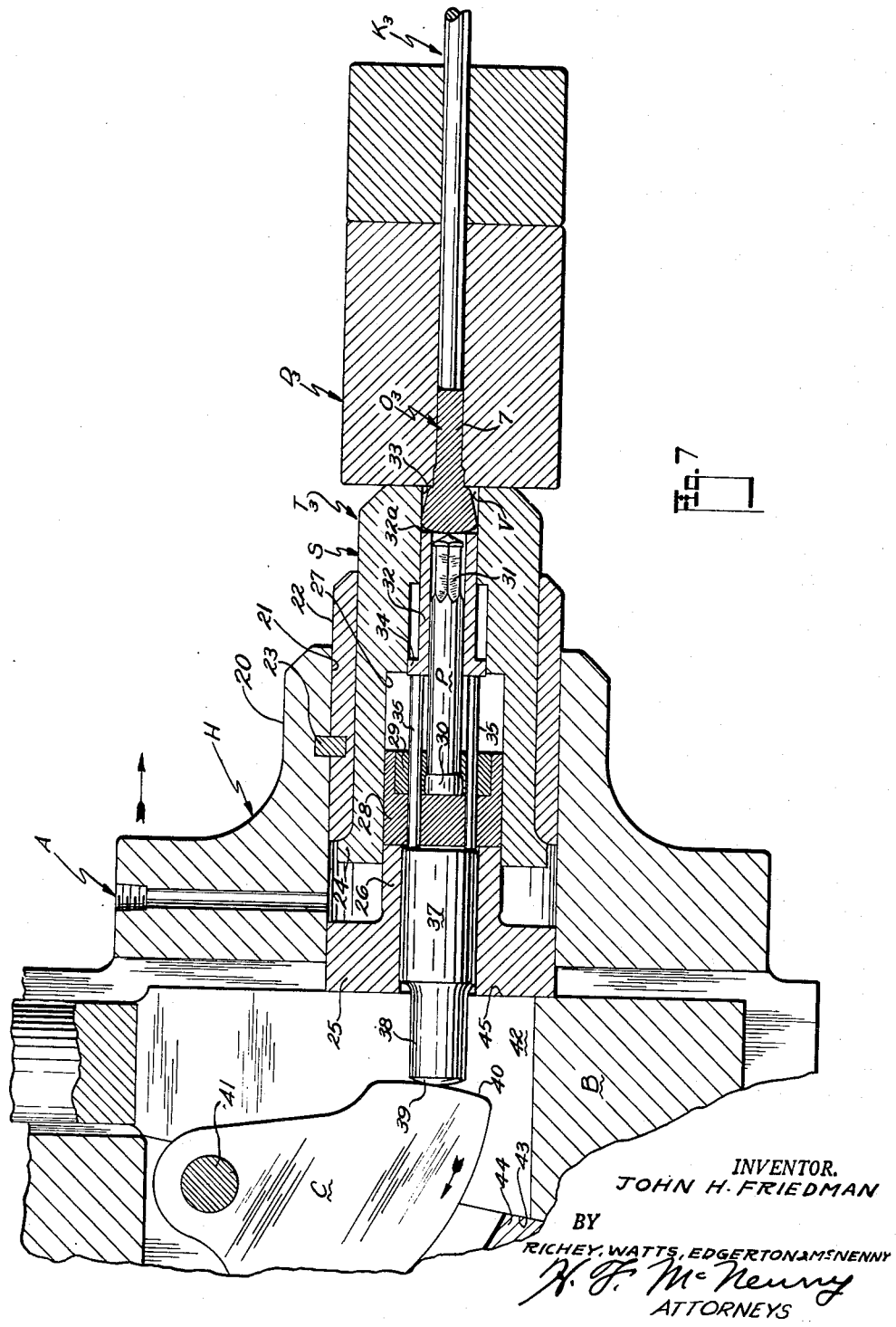

June 15, 1954   J. H. FRIEDMAN   2,680,860
APPARATUS FOR FORMING HOLLOW ARTICLES
Filed May 3, 1949   12 Sheets-Sheet 3
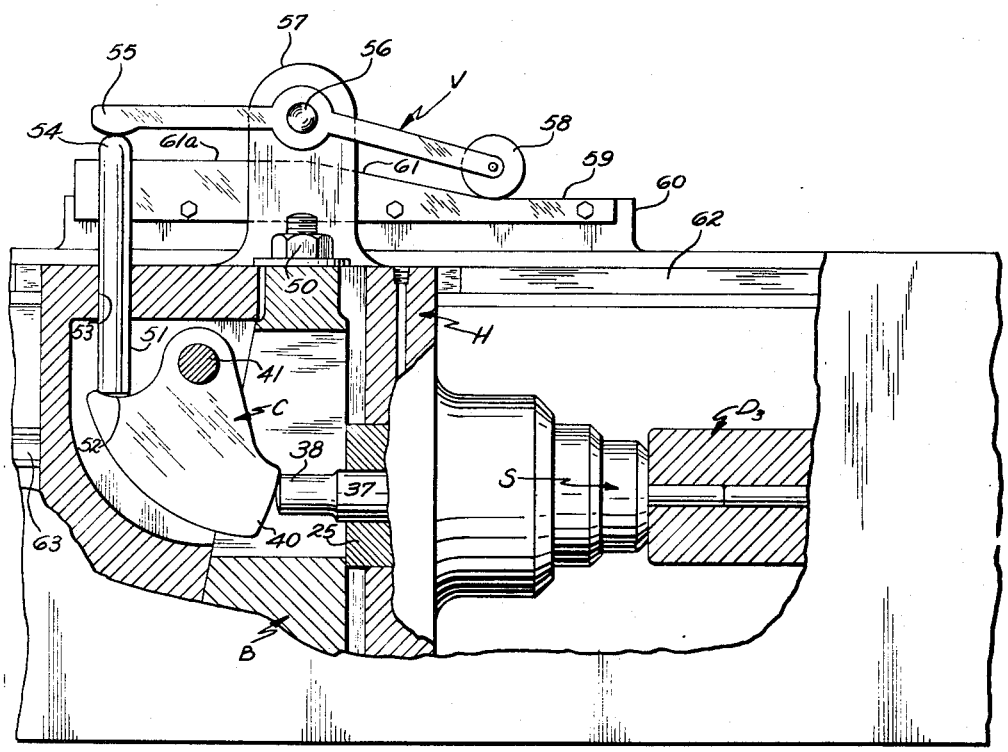
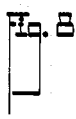
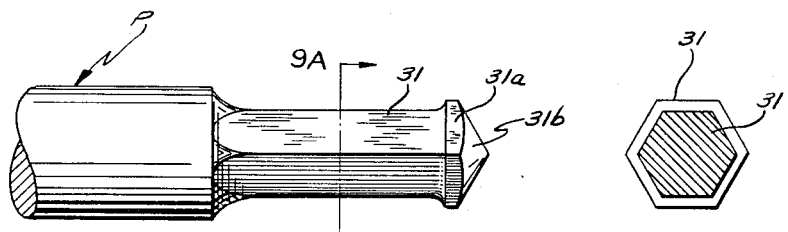
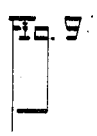
INVENTOR.
JOHN H. FRIEDMAN
BY
RICHEY, WATTS, EDGERTON & McNENNY
ATTORNEYS

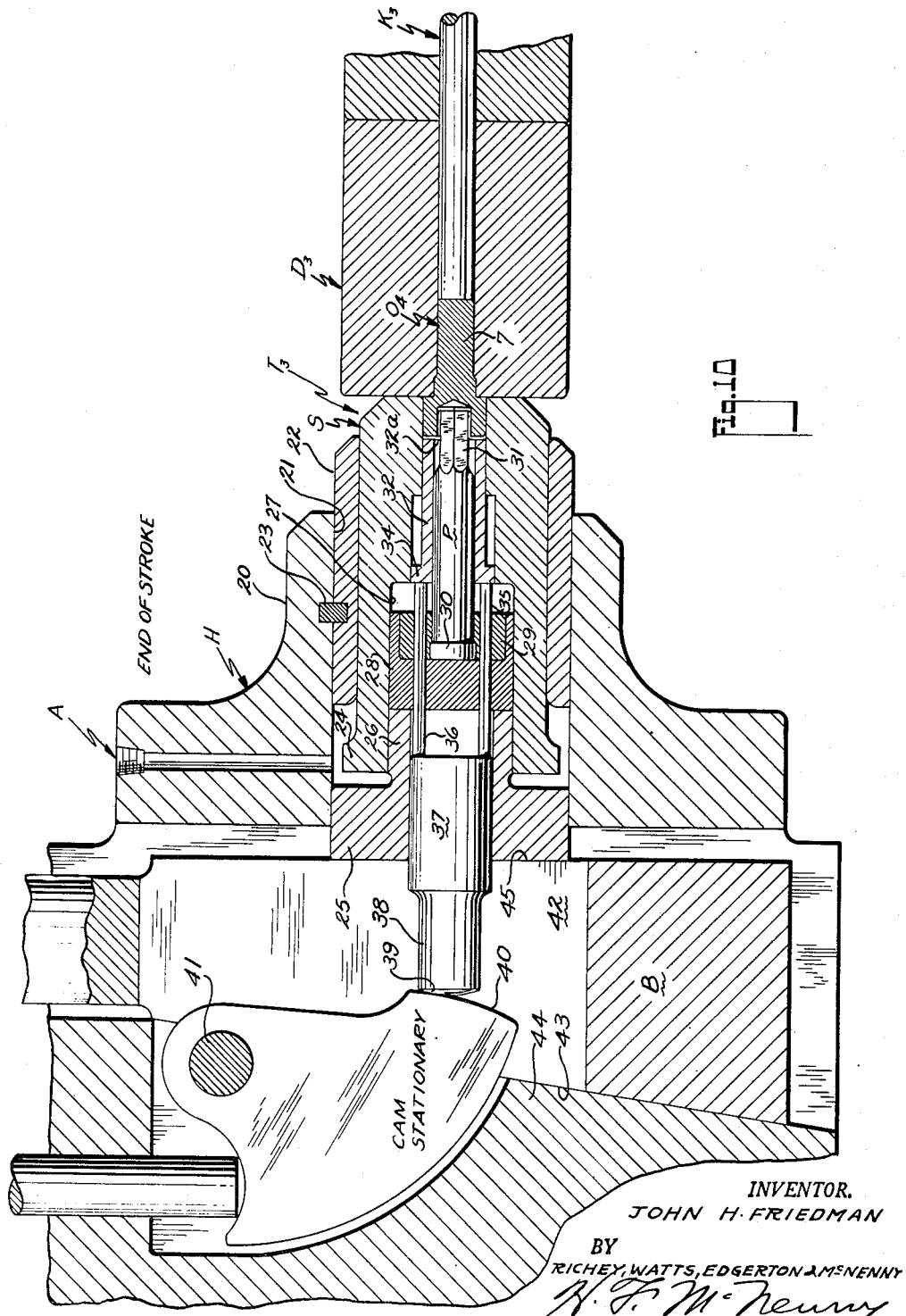

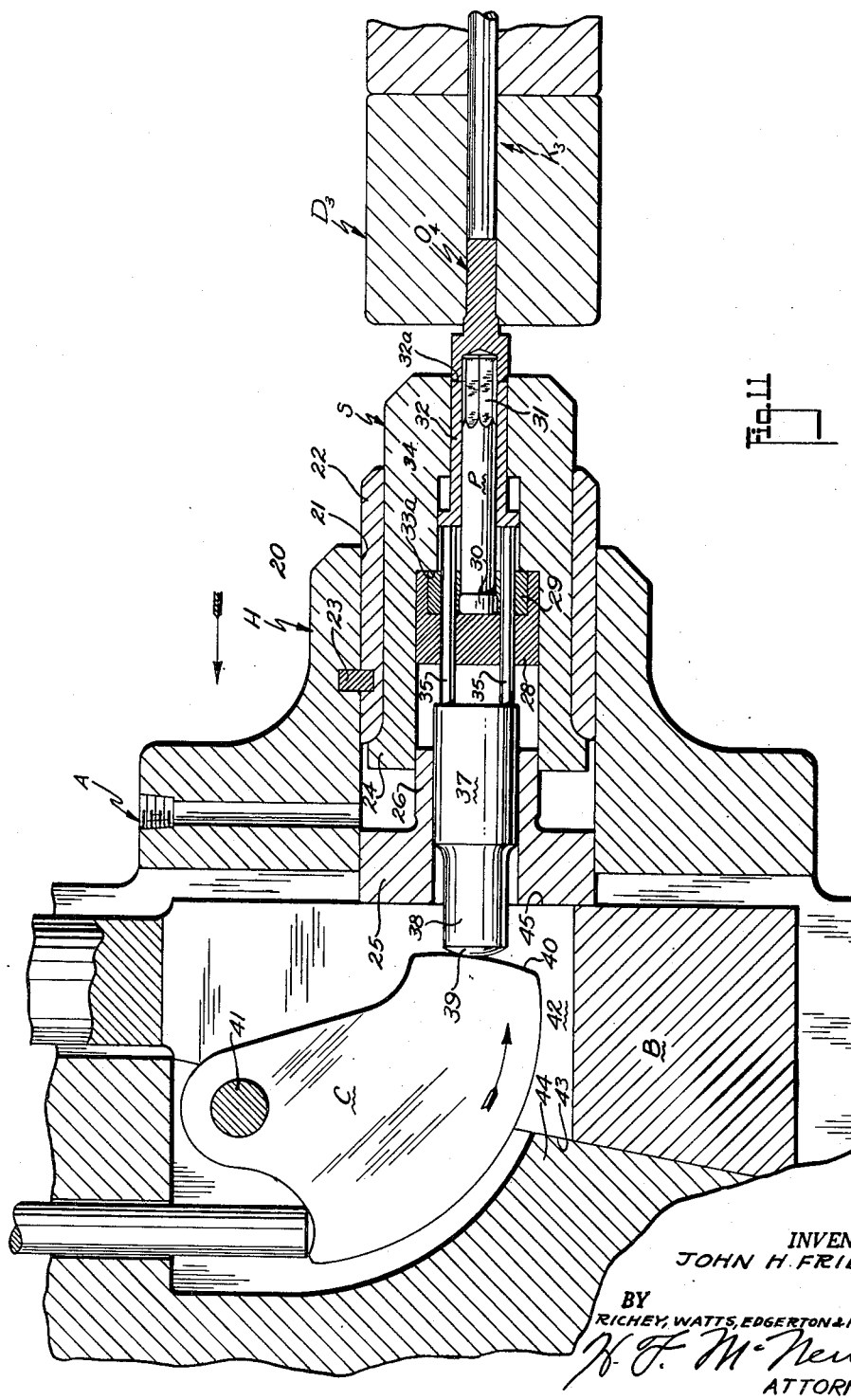

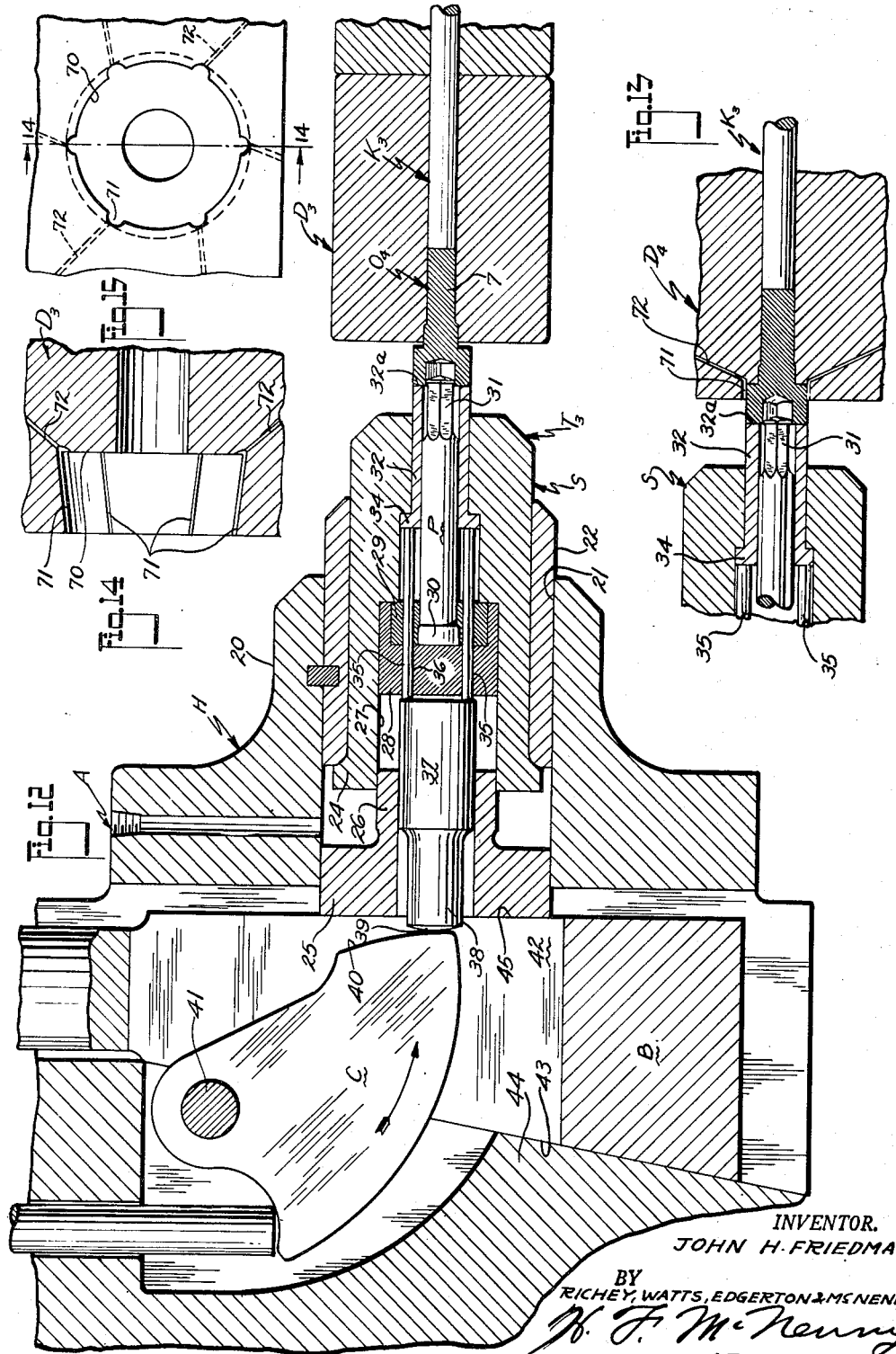

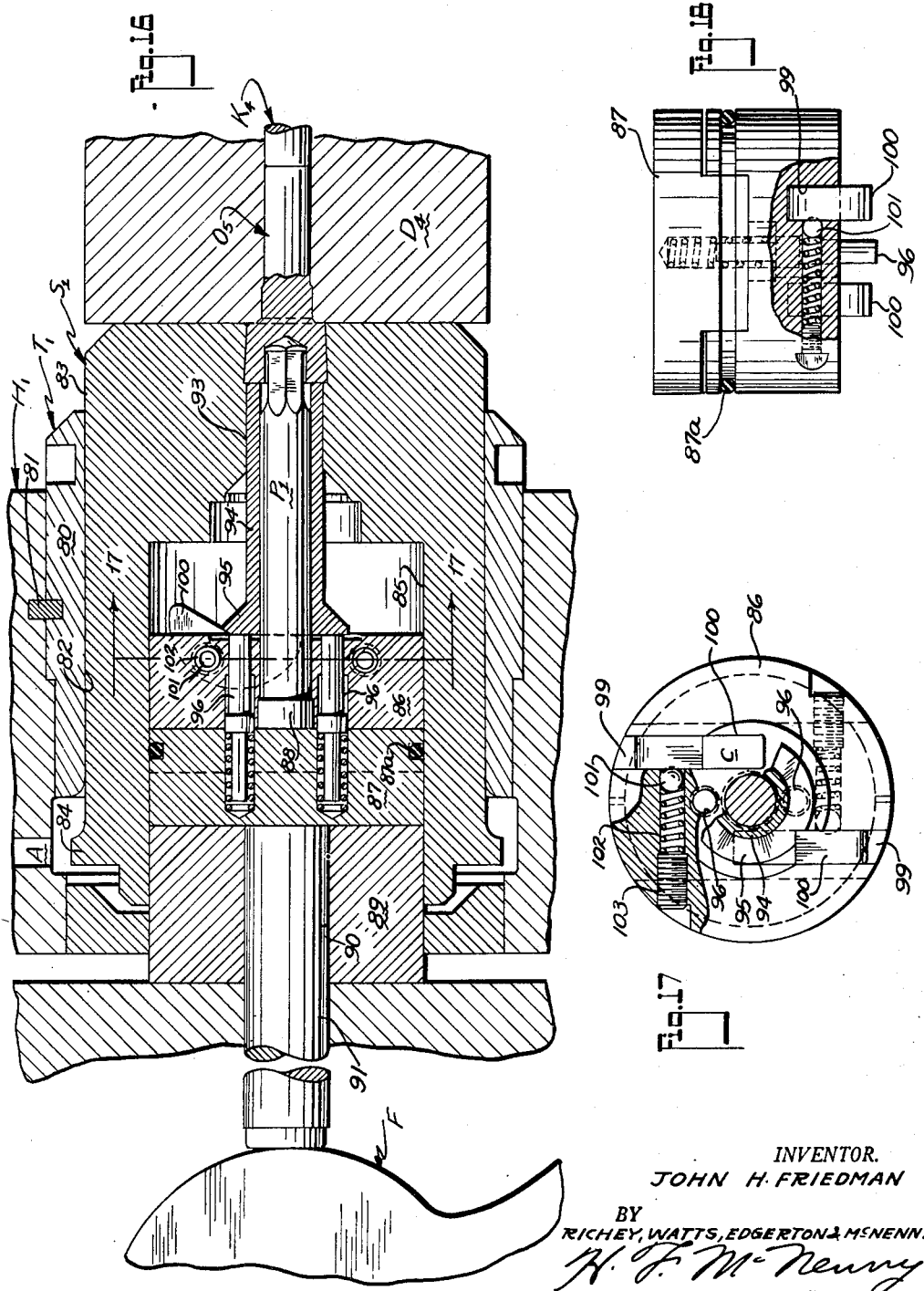

June 15, 1954  J. H. FRIEDMAN  2,680,860
APPARATUS FOR FORMING HOLLOW ARTICLES
Filed May 3, 1949  12 Sheets-Sheet 8
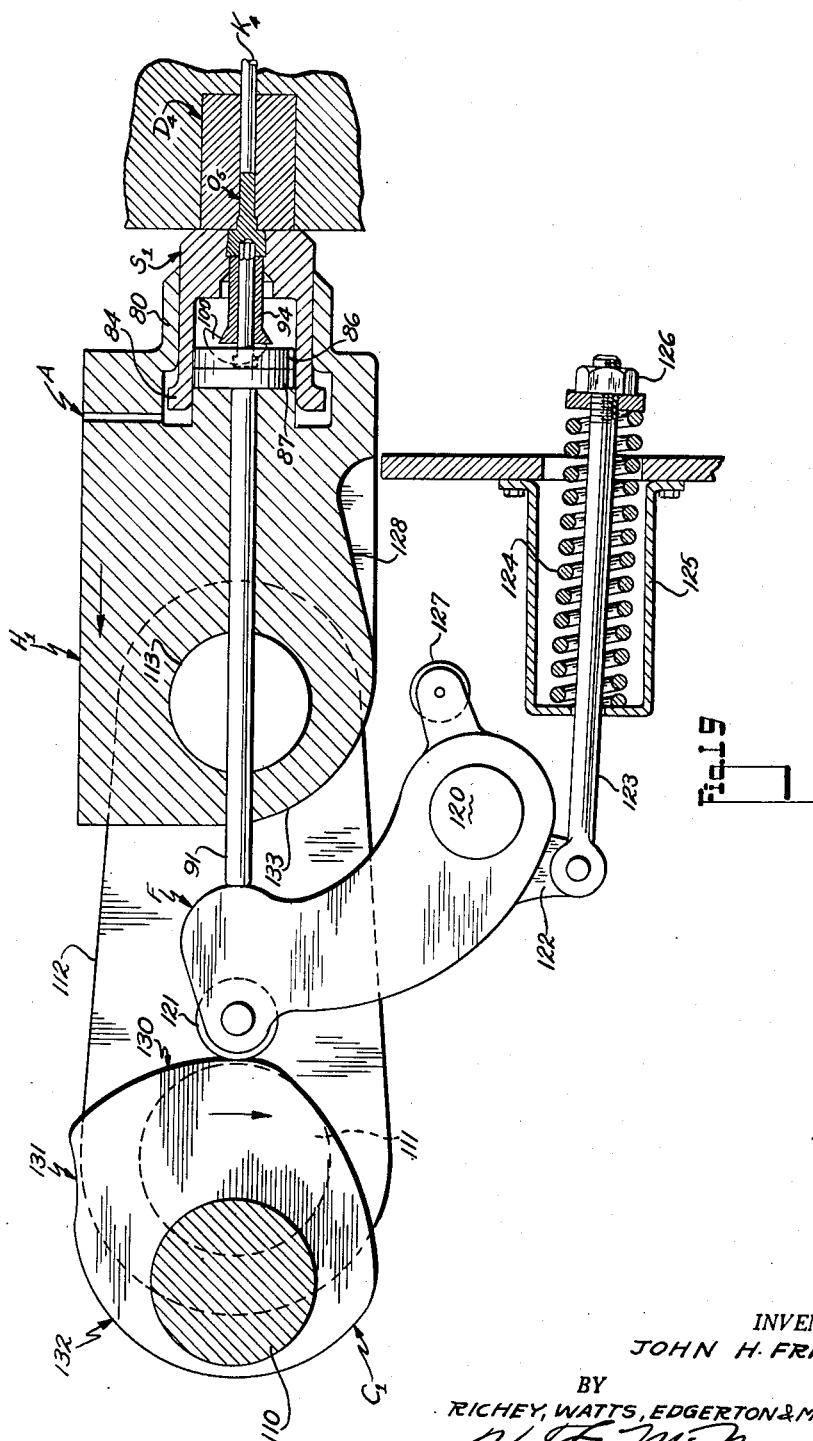
INVENTOR.
JOHN H. FRIEDMAN
BY
RICHEY, WATTS, EDGERTON & McNENNY
ATTORNEYS

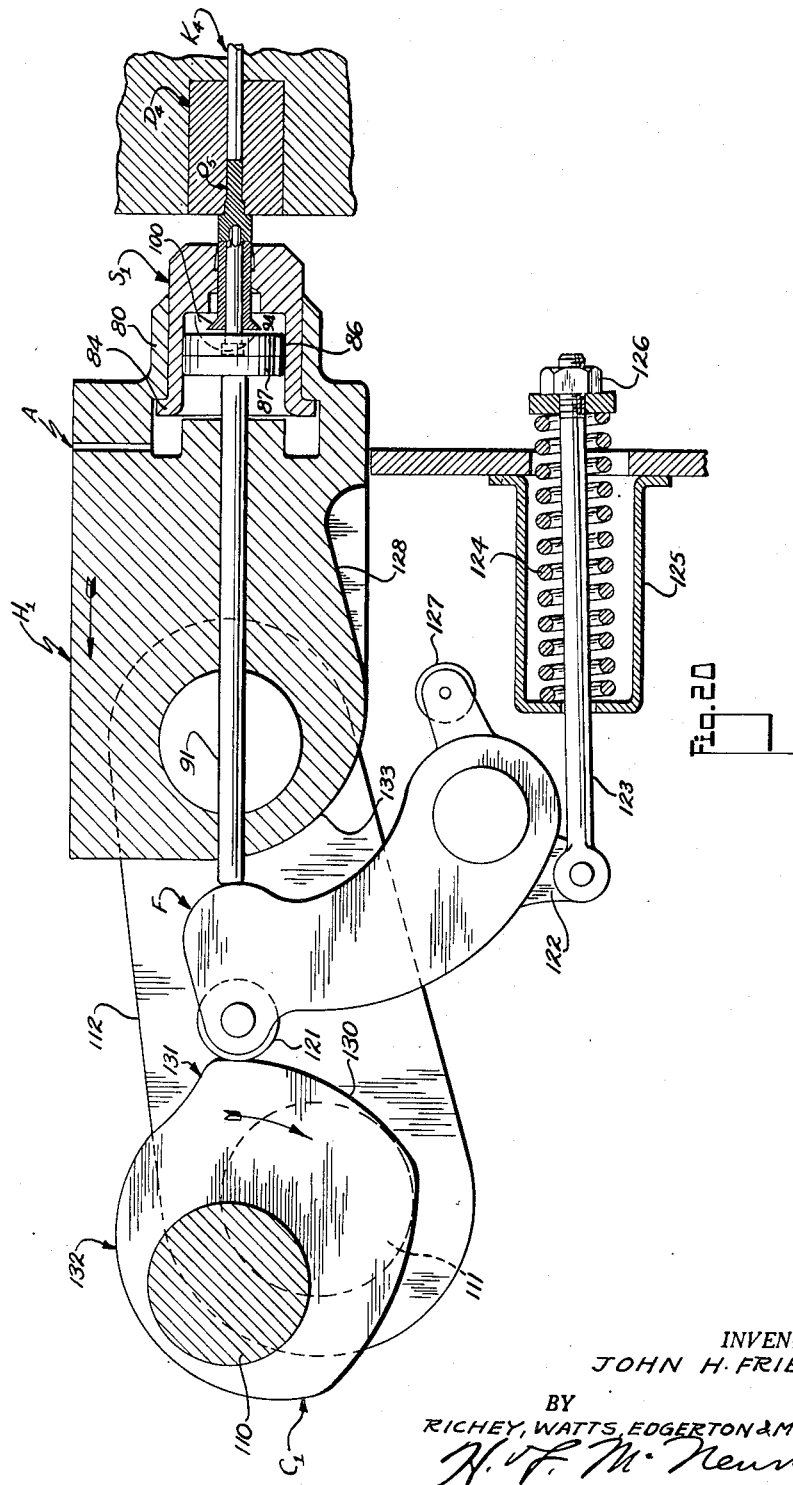

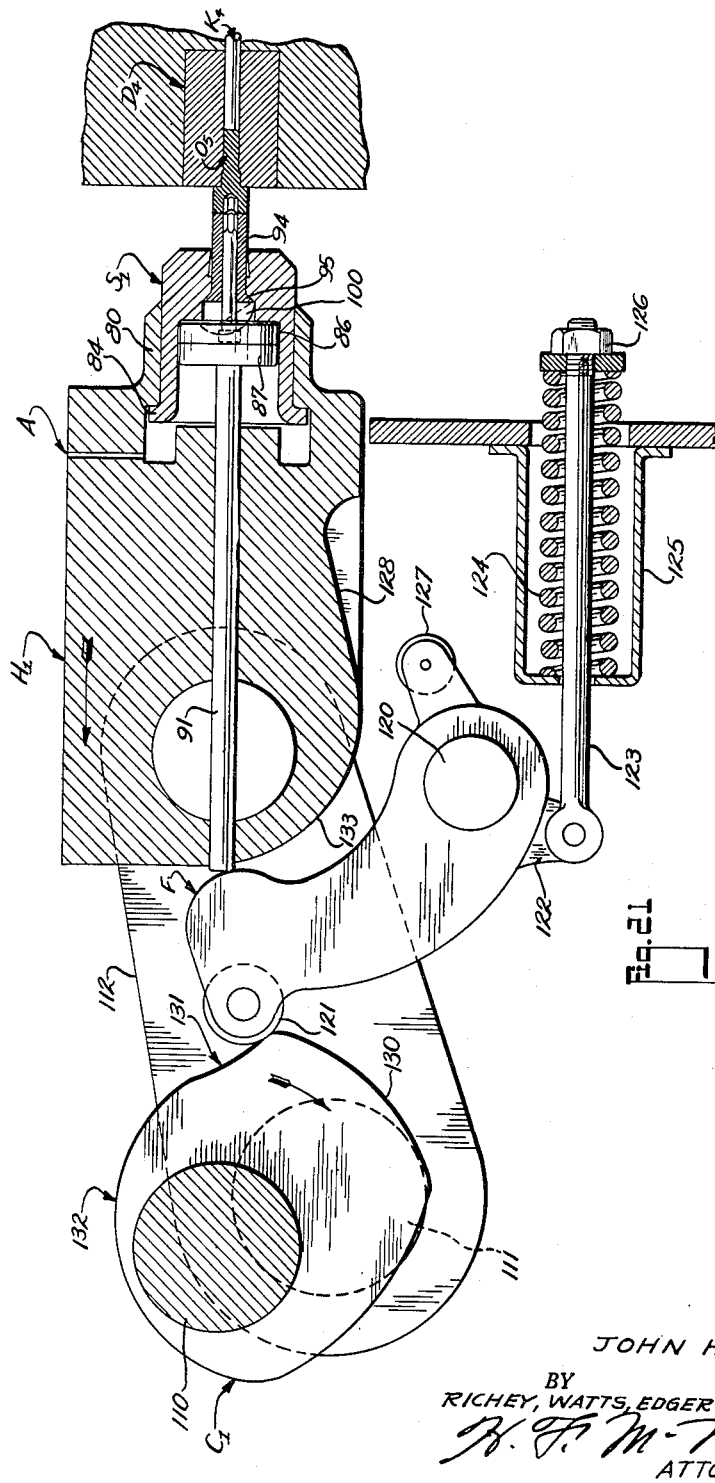

June 15, 1954    J. H. FRIEDMAN    2,680,860
APPARATUS FOR FORMING HOLLOW ARTICLES
Filed May 3, 1949    12 Sheets-Sheet 11
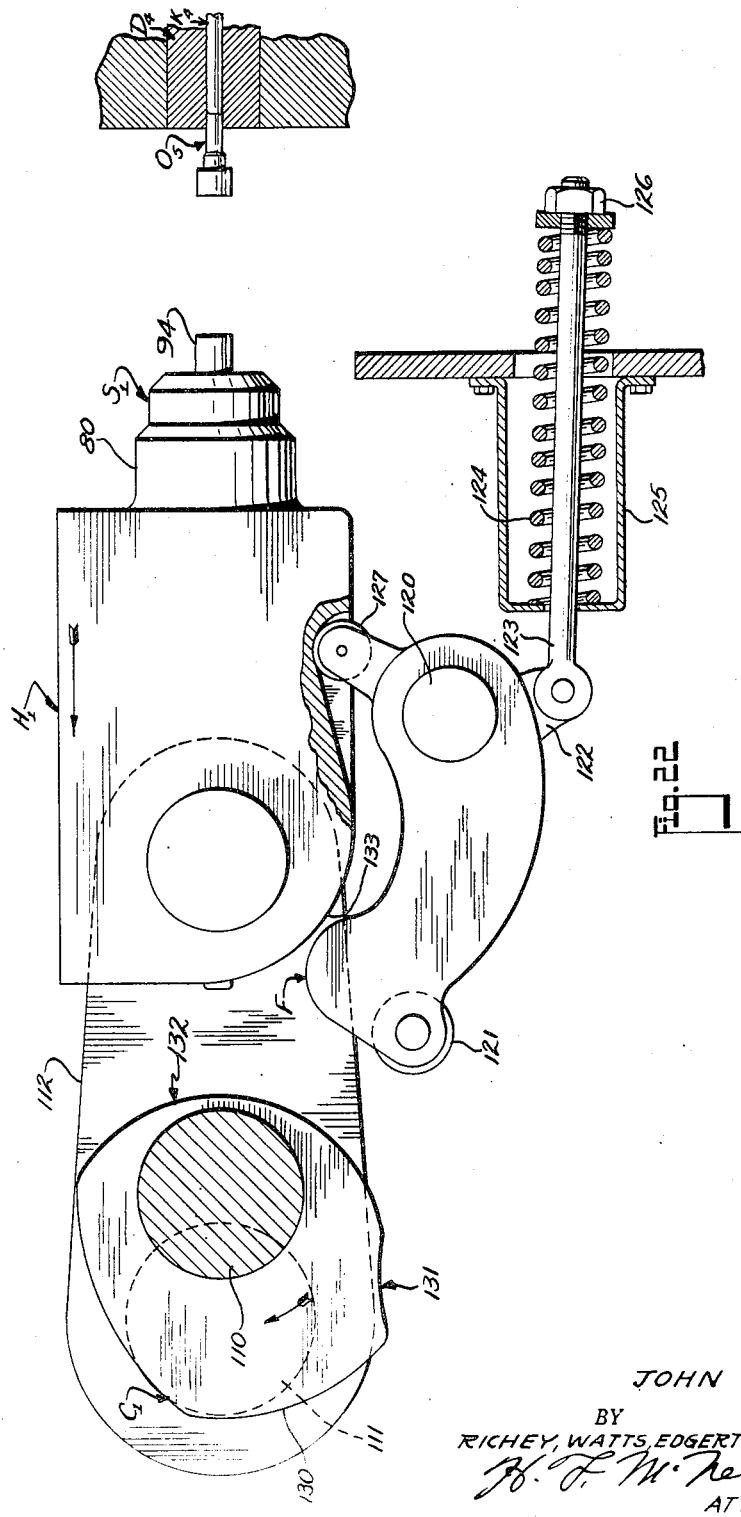
INVENTOR.
JOHN H. FRIEDMAN
BY
RICHEY, WATTS, EDGERTON & McNENNY
ATTORNEYS

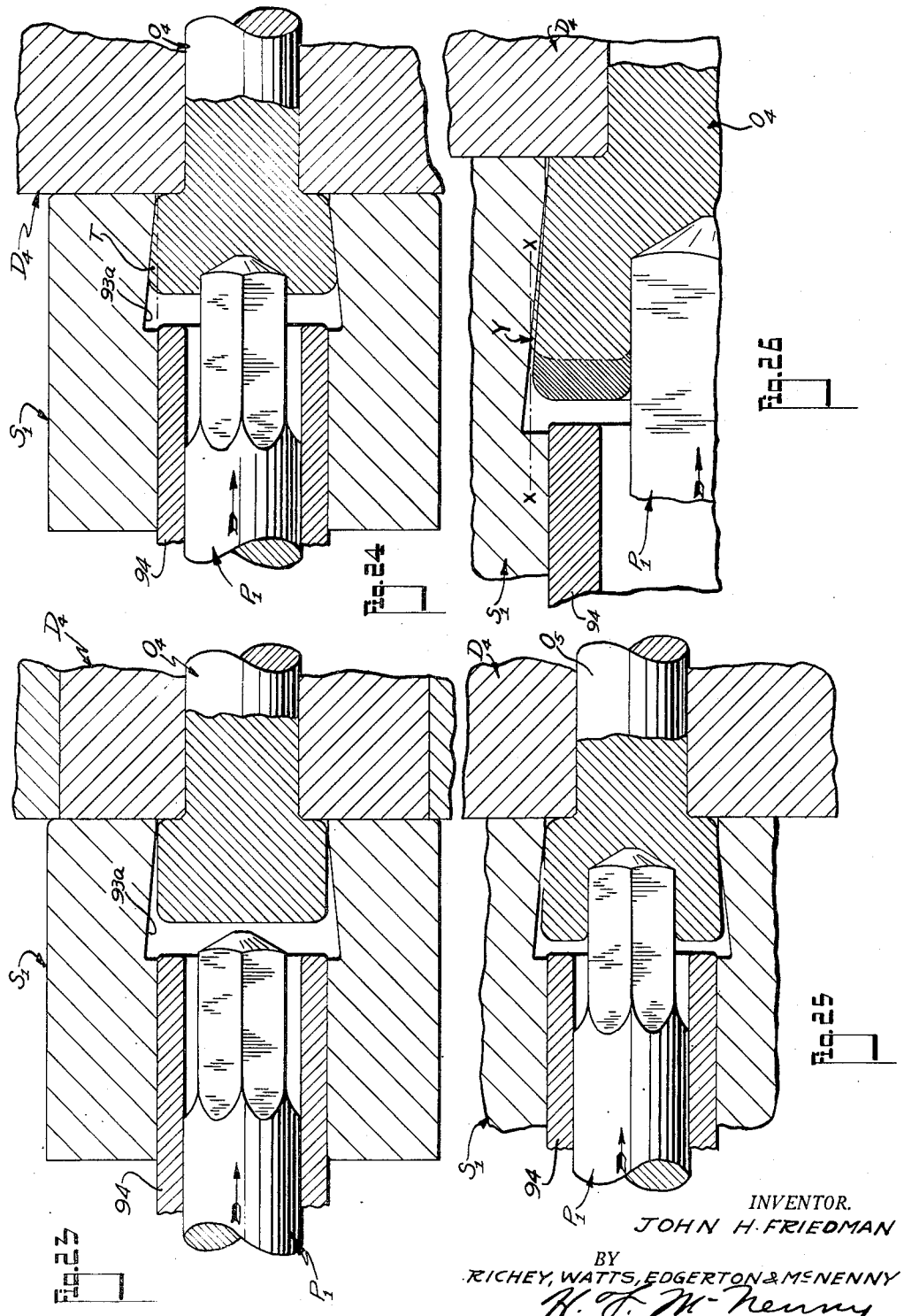

Patented June 15, 1954

2,680,860

UNITED STATES PATENT OFFICE 2,680,860

APPARATUS FOR FORMING HOLLOW ARTICLES

John H. Friedman, Tiffin, Ohio, assignor to The National Machinery Company, Tiffin, Ohio, a corporation of Ohio Application May 3, 1949, Serial No. 91,030

14 Claims. (Cl. 10—11)

This invention relates to cold headers, and more particularly to apparatus for forming socketed cap screws or bolts from wire or rod stock by cold working the metal. A type of machine that may embody the invention comprises a machine frame and die block containing a number of dies, a reciprocating header slide carrying metal forming tools and an intermittent feed mechanism to feed the stock to one of the dies at the proper time such as that shown in Clouse 1,856,027, dated April 26, 1932. The machine may also include a shear mechanism to shear off a blank from the stock and transfer mechanism to transfer the blanks from die to die until the final operation is completed, a typical transfer mechanism being shown in Clouse, 2,026,823, dated January 7, 1936. Such machines are commonly provided with the means to knock out the various blanks from their respective dies at the proper time in order that they may be received by the transfer mechanism and one form of knock-out mechanism which I have found satisfactory is shown in Clouse, 2,038,543, dated April 28, 1936.

A great deal of trouble with tool breakage occurs in cold metal working operations wherein a punch or tool is used to pierce or socket a blank. The axial pressure causes the tool to shift vertically and horizontally in one direction or the other to the extent of the clearance which necessarily exists between the slide and its guideways. All wear that occurs, and any misalignment that may exist in the parts, aggravate this condition, creating excessive side thrust on the tool. This results in excessive wear or fracture of the hardened tool. In the present invention it has been found that tool breakage can be largely eliminated from this cause if the punch is accurately centered with respect to the portion of the article to be punched or socketed, irrespective of punch location relative to the portion of the blank which is not punched, and irrespective of the relation of the punch to the axis of the die. In this invention the punch is centered with the blank by providing a centering sleeve on the tool which may surround the punch and which is of the same diameter or contour as that of the head of the blank. As the slide advances the sleeve is forced over a portion of the blank, and since the punch is centered with the sleeve, the punch is automatically centered with the portion of the blank to be worked.

Another cause of rapid tool wear in prior cold heading operations of the sort to which this invention relates is the reverse flow or extrusion of metal along the walls of the metal confining member or die during the socketing operation. Not only does this excessively cold work the metal and make it brittle, but it rapidly wears and abrades the confining die so that accuracy is not maintained. It is an object of an embodiment of this invention to largely eliminate die and tool wear due to extrusion of the metal. This is accomplished by so forming the confining sleeve or die that the diameter of the mouth presented to the metal, as it extrudes in a direction opposite to motion of the punch, gradually increases whereby metal which would otherwise tend to extrude and rub along the wall of the confining member continuously clears itself from the wall. This not only greatly reduces die wear but also facilitates entry of the punch into the blank.

With thin walled blanks it is generally desirable to confine the blank during the punching or socketing operation in order to prevent expansion of the blank past its elastic limit. When articles are confined in a die and punched or socketed, the metal tends to contract or spring back after the punch has passed a given section of the blank so that at the completion of the socketing stroke the body of the blank strongly grips and contracts about the punch. Under these conditions if the punch is withdrawn there is a tendency for it to withdraw the blank from the die. If the blank is restrained so that the punch cannot withdraw the blank from the die, withdrawal of the punch through the contracted aperture or socket applies a powerful abrading and compressing force on the punch causing it to wear rapidly. It is another object of this invention to punch the blank while confined and at the same time facilitate withdrawal of the punch and minimize tendency of the punch to withdraw the blank from the die. This is accomplished by confining the head only during the punching or socketing operation so that the upsetting pressure created during the socketing or punching operation is relieved before the punch is withdrawn from the socket in the blank. In a preferred form of apparatus this novel action is made possible by the provision of a sleeve which surrounds the portion of the blank to be punched or socketed during the socketing operation, combined with special structure carried by the slide to hold the blank adjacent the die and free the sleeve from the blank before withdrawing the punch.

In order to hold the blank at the die during retraction of the sleeve as well as retraction of the punch from the blank, there is provided a novel and positively acting stripping means. Although the stripping apparatus is carried by the header slide, its parts are properly positioned relative to the die during the retract stroke of the header slide, so that the stripper bears against the blank and holds it substantially stationary relative to the die. This is accomplished by controlling motion of the stripping apparatus independently of motion of the header slide, preferably by cam means operable to hold parts of the stripping apparatus stationary as the slide retracts.

A further object in a modified form of the present invention is to have the die grip the blank to assist in retaining the blank in the die after the socketing operation and during the punch withdrawing operation. This is accomplished by forming a partial socket for the head or blank in the die so that upsetting pressure expands the head against the socket wall causing it to firmly grip the blank. The socket in the die is sufficiently shallow so that upsetting pressure adjacent that portion of the headed article which is socketed by the punch may be relieved, faciliating withdrawal of the punch from the blank, and may be slightly conical to augment the retaining force on the blank.

These and other objects will be apparent to those skilled in this art as the following description proceeds.

In the drawings:

Figs. 1 and 2 show the operation performed at the first die in a preferred form, after the blank has been sheared off by the shearing mechanism. Fig. 1 shows the sheared blank positioned in front of the die, and Fig. 2 shows the blank being extruded by the first tool;

Fig. 3 shows the blank made at the first die;

Figs. 4 and 5 show the operation performed at the second die, Fig. 4 showing the blank made in the first die positioned in front of the second die, and Fig. 5 showing the heading operation completed in the second die;

Fig. 6 shows the blank made in the second die;

Fig. 7 is an enlarged sectional view showing the novel sleeve, punch, and extractor tool assembly which works in connection with the third die;

Fig. 8 is a schematic diagram of a portion of the header illustrating how the extractor sleeve is positioned by a fixed cam as the header slide reciprocates;

Figs. 9 and 9a are enlarged views of the end of the socketing punch which would be used to form a hollow hexagonal socketed cap screw;

Fig. 7, referred to previously, also shows the initial stages in the final operation at the third die, and Fig. 10 shows the completion of the socketing operation at that die;

Fig. 11 is taken with the header slide retracting at the time when the sleeve has been withdrawn from the headed article and the mechanism is about to withdraw the punch from its socket in the article.

Fig. 12 is a section taken at a time when the punch is almost completely withdrawn from the blank;

Figs. 13, 14, and 15 show a modified form of die wherein part of the head is formed in the die itself;

Figs. 16 to 26 show a modified form of stripping mechanism as well as a modified tool and die structure;

Fig. 16 is a longitudinal section showing the tool die and stripping assembly in a preferred embodiment;

Fig. 17 is a section taken on line 17—17 of Fig. 16 with certain parts broken away;

Fig. 18 is a fragmentary plan view of certain parts of the stripping mechanism;

Figs. 19 to 22 are diagrammatic simplified views of the tool and die means in the header slide and the cam operating mechanism for the stripper with Fig. 19 showing the apparatus at completion of the punching operation; Fig. 20 showing the confining sleeve stripped from the blank; Fig. 21 showing a punch stripped from the blank; and, Fig. 22 showing the header slide retracted;

Figs. 23 to 26 are enlarged fragmentary views showing the novel cooperation between the confining means and the blank during the punching operation;

Fig. 23 shows the punch about to engage the blank;

Fig. 24 shows the punch part way projected into the blank at a point where the side wall of the blank just engages the side wall of the sleeve;

Fig. 25 shows the blank after completion of the punching operation; and

Fig. 26 is an enlarged fragmentary section of Fig. 25 showing how the metal flows.

In Fig. 1 the sheared blank $O_1$ is shown positioned in front of the first die $D_1$. Of course, the complete machine has a shearing mechanism and a transfer mechanism to cut off and position the blank, but this is conventional structure and the patents previously cited are relied upon to illustrate one example of how these mechanisms may be provided. The die $D_1$ in a preferred form has an aperture 1 of smaller section than the blank $O_1$ and a tapered wall 2 may connect with a larger bore 3 in the die, the bore 3 being substantially the same diameter as the blank $O_1$. The tool $T_1$ has a socket 4 the same size as bore 3 and the tool may be tapered back as at 5 to provide clearance.

After the blank $O_1$ is positioned in front of the die by the transfer mechanism, the tool $T_1$ advances as shown in Fig. 2, forcing the blank into the shank or reduced portion 1 of the die so that an extruded shank portion 7 is formed. The portion 6 of the blank now forms a head, which, although it is larger in diameter than the shank portion 7, has been subject to little or no cold work. At the completion of this operation, and as the header slide and tool retract, a knockout punch $K_1$ is operated in a properly timed relation by conventional mechanism to eject the blank $O_2$ from the die $D_1$ and into the transfer mechanism which has been positioned in front of the die to receive the blank.

Fig. 3 shows the blank $O_2$ made in the first die.

In Fig. 4 the blank $O_2$ is shown positioned in front of the die $D_2$. This die has a cylindrical bore 10 which receives the knock-out punch $K_2$ and which is of the same diameter as the shank portion 7 of the blank. The die also has a tapered bore 11 terminating in a shallow straight bore 11a for determining the shape of the head. The tool $T_2$ may be formed to receive a hardened die block 13 into which a heading recess may be formed, one form of such recess having a conical recess 14 and a generally spherical bottom wall 15.

As seen in Fig. 5, when the tool $T_2$ forces the blank into the die $D_2$, the shank portion 7 is relatively unaffected but the metal that was formerly the head 6 in the blank $O_2$ is headed to fill in the die so that the blank $O_3$ has a head which is formed with a conical portion 16a, cylindrical portion 17, another conical portion 18 and a rounded end portion 19. Due to the fact that this operation represents the first cold working of the headed portion of the blank and also due to the fact that the head made in the operation shown in Fig. 5 is conical and is not of much greater diameter than the unworked head 6 in the blank O₂, the operation shown in Fig. 5 does not seriously cold work the metal and it is still in a relatively ductile condition for the socketing operation which follows.

Fig. 6 shows the blank O₃ made in the second die.

Before completing the description of the cycle of operations in the present invention, reference is made to Fig. 7 for a description of the novel tool arrangement at the third die. Header slide H, which is mounted for reciprocation in the conventional manner to and from the die block, has formed at this station a tool supporting sleeve 20. Sleeve 20 is apertured as at 21 to receive sliding sleeve S and its mounting sleeve 22, the mounting sleeve 22 being keyed in any convenient fashion as at 23 to the header slide. A flange 24 at the rear of the sliding sleeve S prevents withdrawal of the sleeve in a forward direction after the parts are assembled. A punch assembly P and a stripping sleeve 32 are carried within the sleeve S and are retained therein by a plug member 25 which is mounted within the aperture 21 of the header slide. Plug 25 has a pilot portion 26 over which the sleeve S may slide due to the aperture 27 in the sleeve. A pair of plunger blocks 28 and 29 are assembled over the head 30 of the pin P and this assembly, along with the stripping sleeve 32 are inserted through the bores in the sleeve S. The hexagonal socketing portion 31 of the punch is disclosed in detail in Figs. 9 and 9a. The sleeve S is apertured at 33, the diameter of the aperture being equal to the diameter of the head on the finished cap screw. Since the stripping sleeve 32 slides in aperture 33, it, too, is of the same diameter. The end 32a of the stripping sleeve 32 is provided for engagement with the head of the blank and is retained there by mechanism which will be described presently.

The rearward portion of the stripping sleeve 32 has a flange 34 against which a plurality of pins 35 bear, these pins passing through apertures 36 in the punch plunger blocks and being integral with, or attached to in any convenient manner, a plunger member 37. An extension 38 of the plunger member 37 has a rounded end 39 for operation by cam surface 40 on a bell crank or lever member C. Member C is mounted in the header slide by pivot 41 and is operated in a manner to be hereinafter described. The header slide is slotted as at 42 to receive lever C, and a wedge member W is provided to retain the plug 25 in the proper position. It is customary to have an axial bolt engage the plug 25 from the front to provide, in conjunction with the wedge, the necessary adjustment. The other wedge surface 43 engages the rear wall 44 of the slot in the header slide.

Referring to Fig. 8, the method whereby the stripping sleeve is actuated is shown. Here the sliding sleeve S is unsectioned, but the stripping plunger 37 and its extension 38 may be seen engaging surface 40 of the lever C. Lever C is operated by a push rod 51 which bears against a socket portion 52 of the lever. The push rod passes through an aperture 53 in the header slide and the upper end 54 of the push rod 51 is actuated by the end 55 of a lever member V. Lever V is a cam follower member; it is pivoted at 56 to a support 57 which support is mounted upon, and reciprocates with, the header slide. The other end of the lever L may carry a cam follower roller 58 for engagement with the fixed cam strip 59 supported as at 60 on a stationary part of the machine. The header slide in Fig. 8 is shown in its forward position. As the header slide is retracted roller 58 rides up the sloped surface 61 of the cam 59 which forces the push rod down, rotates bell crank C, and thereby moves plunger 37 to the right. As can be seen by referring back to Fig. 7, this will move the stripping sleeve 32 to the right. Thus, as the header moves back the cam may be designed to move the stripping sleeve forward an equal amount so that in effect the stripping sleeve stands still relative to the die.

The enlarged view of the punch in Figs. 9 and 9a illustrates a form of the punch employed to form a hexagonal socket in the cap screw. It has been found that if the hexagonal portion 31 terminates in a slightly enlarged hexagonal flange 31a that withdrawal of the punch is facilitated. A conical end portion of the punch 31b facilitates entry of the punch during the socketing operation. Of course, the shape of the punch can be modified to produce a socket of any desired configuration.

Having completed the description of the special tool at the third station and how the stripping sleeve is operated, the description of the cycle wherein a completed blank is made will be resumed. The blank O₃ as shown in Fig. 6, the head of which has only received one forming operation in the preferred form, is positioned by the transfer mechanism in front of the die D₃ shown in Fig. 7. As the header slide advances the end of the punch engages the head of the blank O₃ and forces the shank 7 into the corresponding aperture in the die D₃. The punch is forced into the blank by engagement of the plunger block 28 with the extension 26 of the backing plug 25.

The situation at Fig. 7 is one where the punch has just completed driving the blank O₃ into the die D₃ but the punch has not yet begun to form the socket in the head of the blank. It will be noted in Fig. 7 that the sleeve S has also been advanced so that its aperture 33 surrounds the head of the blank, and it is important to note that due to the conical shape of the head a clearance volume signified by letter V is produced. One convenient method of advancing the sleeve S to the position shown in Fig. 7 is accomplished by providing an air inlet A behind the flange 24 of the sleeve so that if at the proper time the valve is opened, air pressure may be applied to advance the sleeve S. The cam, bell crank, and stripping sleeve assembly is such that as the header slide is advancing to the position shown in Fig. 7 the bell crank C may be moved to the left by the reaction of the stripping sleeve 32 and plunger 37 against the head of the blank O₃. Of course, the cam surface 61 shown in Fig. 8 is such that a clearance is steadily provided at the push rod permitting bell crank C to be readily moved to the left as described.

Fig. 10 shows the completion of the socketing operation with the header slide fully advanced. The punch portion 31 of the punch has now formed a socket in the head of the blank to make the final blank O₄. The socketing operation is performed without extrusion or reversed flow of the metal and without serious wear on the punch because the metal can flow into the clearance volume V formed between the conical head and the sleeve S as illustrated in Fig. 7.

The stripping sleeve 32 has continued to move back relative to the header slide during this final advance of the heading tool, and I prefer that cam 59 be designed so that at the completion of the heading stroke there is a tolerance or clearance between the end of the stripping sleeve and the headed blank.

Fig. 11 shows an early stage in the retract stroke of the header slide which is now moving to the left in the drawing. As retraction of the header slide begins, the punch tends to withdraw the bolt from the die but as soon as the small clearance between the head of the bolt and the stripping sleeve 32 is taken up the bolt can be withdrawn no further. As retraction continues the cam 59 on the frame of the machine operates through the follower arm and push rod to move the bell crank C to the right so that the stripping sleeve 32 remains essentially stationary relative to the die.

At the position shown in Fig. 11 a rear portion of the mounting sleeve 22 has engaged with the flange 24 on the stripping sleeve S and has withdrawn it from around the head of the bolt. Of course, the compressed air may have been shut off at the end of the stroke if so desired. It will likewise be seen that a shoulder 33a on the sleeve S is brought into engagement with the plunger blocks 28 and 29 which restrain the head 30 and the punch P. Any further retraction of the header slide from the position shown in Fig. 11 will withdraw the punch P from the socketed blank. It will also be noticed that since the sleeve S no longer confines the head of the bolt, the bolt head is free to spring out slightly or to expand as the end of the punch is withdrawn so that abrasion and wear of the tool is reduced to a minimum.

In Fig. 12 the header slide has moved still further back on the retract stroke to a point where the end of the punch P is just about clear of the bolt. However, the cam on the frame of the machine is still causing the bell crank C to move to the right and to maintain the stripping sleeve 32 against the bolt head so that the punch can be withdrawn without stripping the blank from the die. It will be noticed that the sleeve S is well clear of the head of the bolt by this time.

Immediately after the position shown in Fig. 12 the punch will be completely clear of the blank and further retraction of the header slide will carry the stripping sleeve 32 with it. This is because, as shown in Fig. 8, the roller 58 of the cam lever L will be on the upper straight portion 61a of the cam so that now the stripping sleeve will remain stationary relative to the header slide instead of relative to the die. With this arrangement the header slide can carry the stripping sleeve well clear of the blank O4 in order that the knock-out pin K3 may strip the blank from die D3 at the proper time. Of course, the blank O4 is knocked out into a chute or transfer mechanism or any other receiving means depending upon the type of machine and the operations remaining to be performed on the blank.

It can be seen that I have illustrated an invention whereby the socketed and headed article is produced with a minimum of cold working the metal and in a manner in which the dies and tools receive very little wear and are subjected to no extruding or abrading action from the metal of the blank. The combination of starting with an unworked and headed blank such as that shown in Fig. 3 and then forming the blank to have a conical head so that a clearance volume V is available during the socketing operation results in the minimizing of cold flow of the metal and wear of the dies. It can also be seen that, although I have formed my head in a manner so that it is accurately constrained and shaped by the sleeve S, yet this sleeve may be readily withdrawn to permit a slight expansion of the headed article during withdrawal of the punch. Furthermore, an examination of Fig. 7 and those like it will reveal that the punch is centered with respect to the aperture 33 in the sleeve S and, since the sleeve S defines the circumference of the head in the finished blank, the end of the punch must necessarily be centered with respect to the metal in the head of the blank. This centering reduces any tendency for the metal to apply a pressure to the side of the punch which might fracture the same or break it off. Also, both the sleeve and the punch are withdrawn with the blank remaining at the die, due to the novel stripping apparatus.

Figs. 13 to 15 show a slight modification wherein part of the head is formed in the die itself, the die being socketed or recessed as at 70. With this structure it will be noted that the socket 70 is not deep enough to surround any appreciable part of the socketed portion of the head. In this manner when the sleeve S is withdrawn the free end of the headed blank can expand and permit easy withdrawal of the punch as described previously. This modification has an additional feature in that the socketing pressure against the head will tend to expand the metal against the walls of the recess 70 in the die so that, even though the slide sleeve S is retracted, the die D4 will tend to grip the blank firmly and permit withdrawal of the punch. In fact, it might be possible to dispense with the stripping sleeve and its cam mechanism entirely in this form and depend upon the gripping of the die itself to retain the blank in the die until it is knocked out by the knock-out plunger. As shown in Figs. 14 and 15, it might also be possible to taper or undercut the recess 70 to augment the gripping action. Ready flowing of the metal from the conical head such as shown in Fig. 7 into the cylindrical form shown in Fig. 13 will be facilitated if vent lines 71 and 72 are formed in the die. Such vents were unnecessary in the other form because the space between the sleeve S and the die permitted escape of any air or fluid present, but where the die is socketed it might be desirable to provide such vents. The grooves 71 are so small that very little of the material is deformed into them; however, it might be possible to design the grooves so that the head of the bolt is slightly serrated which would have an advantage in some operations in that it might add or augment the gripping action of a chuck upon the head, during subsequent operations such as threading the shank of the bolt.

In the stripping mechanism previously illustrated, a clearance or tolerance is needed in the plunger assemblies to prevent damage to the mechanism. For example, if the cam were not properly adjusted or if the head of the blank were too long, there would be a possibility that the sleeve 32 would be forced against the blank and either the sleeve or the blank damaged or deformed. The form shown in the remaining figures has a somewhat different structure than that previously described and, as will be pointed out presently, the most that can happen under the circumstances referred to is that the punch might possibly be projected into the blank a little farther than normal, which subjects the parts to a relatively small strain.

Referring to Figs. 16 to 18 which show certain details of the novel stripping assembly, the header slide $H_1$ carries a tool assembly $T_1$ and a sleeve $S_1$ acting as part of the die during the punching operation. The die $D_4$ is provided with knockout pin $K_4$ in the conventional manner and the blank in this case is designated by $O_5$ and is shown in its punched condition in Fig. 16. The sleeve $S_1$ is retained in the header slide by means of retaining sleeve 80 and suitable key means or the like 81. A sleeve $S_1$ fits snugly with bore 82 in retaining sleeve 80 and the sleeve has a rear flange 84 which retains it in place in the slide and acts to retract the sleeve when engaged by the header slide. Sleeve $S_1$ has an inner bore 85 in which slide the punch assembly blocks 86 and 87. An O-ring seal 87a is provided to assist in retaining air under pressure entering the air inlet A to advance the sleeve $S_1$ as previously described. Blocks 86 and 87 cooperate to retain the punch $P_1$ by means of a head 88 on the punch. A block 89 functionally integral with the header slide engages block 87 and causes the punch to enter the blank on the forward stroke of the slide. Block 89 is apertured as at 90 to receive a stripping plunger 91 which functions on the retract stroke in a manner to be described presently. A cam follower member F is positioned in the path of the stripping plunger 91 and functions during the stripping operation as will be described in connection with the schematic drawings that follow. A stripping sleeve 94 which corresponds to stripping sleeve 32 in the previous modification, but which is operated differently, surrounds the punch $P_1$ and is formed at the rearward end with an operating flange 95. The sleeve is urged toward its outward position by a pair of spring-pressed plungers 96 engaging the flange 95 mounted by suitable springs in blocks 86 and 87, as shown. In order to simultaneously retain the stripping sleeve 94 against the head of the blank and strip the punch from the blank after the sleeve $S_1$ has been withdrawn therefrom, a pair of stripping cams 100 are mounted in suitable recesses 99 in the block 86, the latter block acting as a forwardly facing shoulder to receive thrust of cams 100. The cams 100 are frictionally retained in place by spring-pressed portion 101 and springs 102 reacting against plug members 103 threaded in the block 86. The cams act as spreaders when engaged by the slide, tending to separate the stripping member and the block 86, as will be described.

Structural details of the stripping mechanism having been illustrated, the action thereof is shown diagrammatically in Figs. 19 to 22, wherein, in the interests of clarity, the structure of the header slide and stripping mechanism is simplified to its basic elements and shown in relationship to the special cam member $C_1$ that controls the operation of the device. The header slide $H_1$ is mounted for horizontal reciprocation in the bed of the machine in accordance with conventional practice and the specific mounting of the header slide frame details and drive for the slide are omitted in the interests of clarity, reference having been made to the aforementioned patents which show typical constructions of these items. The crankshaft includes a main bearing section 110, and cam $C_1$ is mounted thereon. A connecting rod which reciprocates the header slide is shown at 112 and is pivotally connected to offset bearing 111 and to the header slide as at 113. The stripping plunger 91 may engage a cam follower arm F which is pivotally mounted to the frame as at 120 and may have a roller 121 engaging the surface of the cam $C_1$. In order to urge the cam follower against cam 130 during stripping, a spring assembly is provided which comprises a rod 123 linked to the follower arm at 122 and a spring 124 extending between a flange on spring housing 125 attached to the frame and a nut assembly 126 on rod 123. Rotation of the crankshaft is illustrated by the arrow on the cam; the cam has a surface 130 concentric with the crankshaft bearing 110 as well as surfaces 131 and 132 which approach the center of the crankshaft. In order to control the arm F later in the retract stroke a roller 127 mounted on the arm is urged against a cam surface 128 formed on the header slide.

In operation, as the header slide completes its forward stroke, block 89 engages plunger support blocks 87 and 86 and forces the punch $P_1$ into the blank. As previously described, the sleeve $S_1$ has been forced over the head of the blank to confine the same during the punching operation by air pressure admitted into the air inlet A. The parts are illustrated just at the end of the forward stroke in Fig. 19 and it is noted that surface 130 has come under the follower arm, which surface is concentric with the crankshaft. Accordingly, if the plunger 91 is made the proper length, and I prefer that a usual slight tolerance or clearance be given the parts, rotation of the crankshaft which follows the position illustrated in Fig. 19 merely causes the plunger 91 to maintain its position relative to the die and hence does not affect the punch.

An initial portion of the retract stroke is illustrated in Fig. 20 at which time the parts have assumed a position that takes place just before stripping of the punch from the blank begins. Cam $C_1$ is just about to withdraw the concentric surface 130 from behind the cam follower and sleeve 80 moving with the slide has engaged flange 84 on the sliding blank confining sleeve $S_1$. In this manner the header slide has stripped the sleeve $S_1$ from the blank so that it is no longer confined but, at the same time, the circular cam surface 130 has maintained the position of the plunger 91 and the punch $P_1$ in its previous relationship to the die so that the punch has held the blank in place in the die as the sleeve was stripped over the head of the blank. It is noted that at about this part of the return stroke an inner wall of the sleeve $S_1$ comes into engagement with the projecting corners or abutment portions of each stripping or spreading cam 100. Further retraction of the stroke of the header now serves to hold the blank in the die and simultaneously strip the punch from the blank.

As shown in Fig. 21, the dropping surface 131 on the cam now rides under the follower arm F and clears the rollers so that the follower arm can gradually be moved to the left in the view. Likewise, engagement of the sleeve $S_1$ with the stripping cams 100 causes the cams 100 to react against shoulder block 86 (controlled by the cam assembly) so that pressure of the slide is changed in direction and reacts against flange 95 of stripping sleeve 94. In other words, the stripping sleeve 94 is urged to the right while punch $P_1$ and blocks 86, 87 are urged to the left by oppositely acting forces. Thus, the action of the apparatus is such that during this phase the punch is retracted in accordance with the contour of the main cam $C_1$, whereas the stripping assembly tightly retains the blank in the die. Finally, sleeve $S_1$ strikes block 86 and flange 95 on the stripping member so that both punch and stripping member are drawn away from the die.

As seen in Fig. 22, as the header slide retracts fully, follower arm $F'$ is cammed clear by slide surface 133 by cam surface 128 engaging roller 127, and at the die, the blank is knocked out by the knock-out pin $K_4$. As the header slide advances on its forward stroke the follower arm again rides up between the cam and the plunger 91 and the operation just described is completed. It can be seen that with the construction just described, either the knock-out plunger 91 or stripping sleeve 94 may be somewhat short to provide ample clearance for overly long stock, or the other parts such as cam $C_1$ may have tolerances that produce the same effect. Nevertheless, as the header slide retracts the balanced reaction of the stripping cams 100 against the stripping sleeve and against the knock-out plunger soon takes up all tolerance clearance so that the blank is firmly retained in the die while the punch is being withdrawn.

Figs. 23 to 26 illustrate novel tool and die apparatus which may be used in conjunction with the stripping apparatus just described or with the stripping apparatus illustrated in Figs. 7 to 12. The confining sleeve $S_1$ is formed with a conical bore $93a$ which, in the form illustrated, surrounds the head of the blank $O_4$. Fig. 23 illustrates the parts just before the socketing operation begins, and it is noted that there is a clearance between the head of the blank and the sleeve. As the punch moves in to pierce the head of the blank as shown in Fig. 24, the metal first flows radially and fills up the tapered clearance volume T between the blank and the sleeve, until the metal engages the wall of the sleeve, as shown in the figure. Further piercing motion of the punch $P_1$ causes an extrusion of the metal of the blank in a direction opposite to that of punch motion, and if the sleeve $S_1$ were cylindrical there would be abrasion and wear of the die and punch as the metal was forced over the walls thereof. However, by making the wall conical as shown in the figures, once extrusion begins the metal (which is flowing to the left in the figures) continuously clears itself of the walls of the sleeve because the diameter of the mouth facing the metal, and into which it flows is gradually increasing.

Reference is made to Fig. 26, which is an enlarged composite fragmentary section to illustrate this action. In this diagram, the positions of the metal of the blank as it appears in Fig. 24 and as it appears in Fig. 25 or after socketing is completed, are superimposed upon one another. It is noted that any given point on the blank, such as the point "Y," moves substantially axially as during extrusion. This is indicated by the lines $x—x$. Thus, immediately following the position of the punch shown in Fig. 24, each point that formerly engaged the wall of the sleeve clears itself of the sleeve and remains substantially clear thereof or at least exerts no great force thereagainst. Although the metal tends to free itself from the wall of the sleeve, yet the sleeve does exert a confining action in case radical or uncontrolled radial flow occurs. Even so, once the metal is confined under these conditions, it again tends to free itself from the sleeve as extrusion continues. Of course, the taper is very small and that illustrated in the drawings is somewhat exaggerated so that the shape of the socketed blank does not deviate greatly from the cylindrical. When the sleeve $S_1$ is retracted and stripped from the blank, it acts as a die and draws the head of the blank into cylindrical form, equal to the minimum diameter of the opening at the face of the sleeve. Thus, by forming the confining member for the head of the blank so that as the metal extrudes rearwardly each point of the circumference of the blank tends to free itself from the wall of the sleeve or other confining member, I materially reduce wear against the confining member which, in turn, permits the socketing to take place with less force and results in less wear on the punch, all of which is beneficial not only from the standpoint of tool life, but from the standpoint of reduction of the cold working of the blank.

Those skilled in the art will realize that various modifications in design changes may be made in the detailed structure described in this specification without departing from the spirit of the invention. The method whereby the parts of the tools such as shown in Fig. 7 are assembled may be modified; the assembly shown there is merely one which facilitates machining and assembling of the parts. The shape of the cams which operate the stripping mechanism may be modified, the important consideration being that the stripping sleeve be positioned properly at the forward end of the header stroke, and that withdrawal of the stripping sleeve lag withdrawal of the punch.

Although, as shown in Figs. 1 and 2, I prefer to start with an extrusion operation rather than with a heading operation, those skilled in the art will appreciate that I could start with stock of shank size such as the diameter of the bore 1 in the die $D_1$ and upset the end of the stock to form the head 6 shown in Figs. 2 and 3. The choice of starting with an extrusion or a heading operation is governed largely by the relative size of the head and shank, the depth of size of the socket and the material of which the bolt is manufactured.

I have used the expression "cold working" in its usual sense, that is, working below the temperature of rapid grain growth or recrystalization; but my invention is more particularly valuable and useful in the lower temperatures of the cold working range, since at these lower temperatures, up to about 400 or 500 degrees F. difficulties from scale, sticking in the dies and shrinkage are avoided and the problem of cleanly shearing out the wad, which I have solved, is more pronounced.

Although I have illustrated my novel apparatus and method in terms of a socketed cap screw, it will be appreciated that the method of leaving a clearance volume and socketing is equally applicable to the production of any article which is socketed or pierced such as a nut or the like. These and other modifications may be made without departing from the spirit of the invention defined in the appended claims.

Having thus described the present invention so that others skilled in the art may be able to understand and practice the same, I state that what I desire to secure by Letters Patent is defined in what is claimed.

What is claimed is:

1. Apparatus for punching a blank comprising a die block and a reciprocating header slide, a sleeve member slidably mounted in said slide, a stripping member slidably mounted in said sleeve, a punch mounted for sliding within said sleeve, means to cause said sleeve to advance over and surround a portion of the article before the slide completes its work-stroke, means on said header slide to force said tool into said article after said sleeve is positioned about it thereby punching the confined portion of the blank, means on said slide to engage and retract said sleeve on the retract stroke, means carried by said apparatus movable relatively to said slide and engaging said stripping member to cause said stripping member to remain in engagement with the blank during an initial portion of the retract stroke, and means carried in said sleeve engaging said punch to withdraw said punch on the retract stroke of said header slide with said stripping sleeve in engagement with the blank.

2. In a cold header, a stationary die block, a reciprocating header slide, a punch carried by said slide, stripping apparatus movably mounted in said slide, a cam support member mounted on said header at a fixed distance from said die block, and cam and cam follower means reacting between said cam support means and said stripping apparatus, one of said means moving relative to the other as the header slide reciprocates, said cam means being contoured to cause retraction of said stripping member to lag retraction of said slide during an initial portion of the retract stroke.

3. In a cold header, a stationary die block, a reciprocating header slide, a sleeve member slidably mounted in said slide, means to cause said sleeve member to advance over and surround a blank supported in the die block as the header slide advances toward the block, a punch slidable in said sleeve, stripping apparatus movably mounted in said sleeve, a cam support member mounted on said header at a fixed distance from said die block, and cam and cam follower means reacting between said cam support means and said stripping apparatus, one of said means moving relative to the other as the header slide reciprocates, said cam means being contoured to cause said stripping apparatus to engage the blank with retraction of said stripping lagging retraction of said slide during an initial portion of the retract stroke, means on said slide for engaging said sleeve and withdrawing it from the blank with said stripping apparatus in engagement with the blank, and means on said slide for engaging and retracting said punch from the blank after withdrawal of said sleeve and while said stripping apparatus is in engagement with the blank.

4. In a cold header, a frame, a crankshaft rotatable in said frame, a stationary die block, a reciprocating header slide driven by said crankshaft, a punch member slidably mounted in said slide, a stripping member movably mounted in said slide, spreading means movably mounted between said punch and stripping members, a cam driven by said crankshaft, cam follower means reacting between said cam and said punch member, said cam being contoured to cause retraction of said punch member to lag retraction of said slide during an initial portion of the retract stroke, and means movable with said header slide on retraction thereof to engage said spreading means tending to cause separation of said punch and stripping members, whereby said stripping member is urged into engagement with a blank in said die block.

5. In a cold header, a stationary die block, a reciprocating header slide, a punch member slidably mounted in said slide, a stripping member movably mounted in said slide, spreading means movably mounted between said punch and stripping members, a cam support mounted on said header at a fixed distance from said die block, and cam and cam follower means reacting between said cam support means and said punch member, one of said means moving relative to the other as the header slide reciprocates, said cam means being contoured to cause retraction of said punch member to lag retraction of said slide during an initial portion of the retract stroke, and means movable with said header slide on retraction thereof to engage said spreading means tending to cause separation of said punch and stripping members, whereby said stripping member is urged into engagement with a blank in said die block.

6. In a cold header, a stationary die block, a reciprocating header slide, a punch slidably mounted in said slide, shoulder means connected with said punch, a stripping member movably mounted in said slide, spreading means engaging and movably mounted between said shoulder means and said stripping member and including a forwardly facing abutment portion, a cam support member mounted on said header at a fixed distance from said die block, and cam and cam follower means reacting between said cam support means and said shoulder means, said cam and cam follower means moving relative to the other as the header slide reciprocates, said cam means being contoured to cause retraction of said punch and shoulder means to lag retraction of said slide during an initial portion of the retract stroke, and means movable with said header slide on retraction thereof to engage the abutment portion of said spreading means to urge said stripping member into engagement with a blank in said die block.

7. In a cold header, a stationary die block, a reciprocating header slide, a sleeve member slidably mounted in said slide, means to cause said sleeve member to advance over and surround a blank supported in the die block as the header slide advances toward the block, a punch member slidable in said sleeve, a stripping member movably mounted in said sleeve, spreading means movably mounted between said punch and stripping members, a cam support member mounted on said header at a fixed distance from said die block, and cam and cam follower means reacting between said cam support means and said punch member, one of said means moving relative to the other as the header slide reciprocates, said cam means being contoured to cause said punch member to engage the blank with retraction of said stripping member lagging retraction of said slide during an initial portion of the retract stroke, means on said slide for engaging said sleeve and withdrawing it from the blank with said stripping member in engagement with the blank, means movable with said header slide on retraction thereof to engage said spreading means tending to cause separation of said punch and stripping members, whereby said stripping member is urged into engagement with a blank in said die block, and means on said slide for engaging and retracting said punch from the blank after withdrawal of said sleeve and while said stripping member is in engagement with the blank.

8. In a cold header, a frame, a crankshaft rotatable in said frame, a stationary die block, a reciprocating header slide driven by said crankshaft, a sleeve member slidably mounted in said slide, means to cause said sleeve member to advance over and surround a blank supported in the die block as the header slide advances toward the block, a punch member slidable in said sleeve, a stripping member movably mounted in said sleeve, spreading means movably mounted between said punch and stripping members, a cam driven by said crankshaft, cam follower means reacting between said cam and said punch member, said cam being contoured to cause said punch member to engage the blank with retraction of said stripping member lagging retraction of said slide during an initial portion of the retract stroke, means on said slide for engaging said sleeve and withdrawing it from the blank with said stripping member in engagement with the blank, means movable with said header slide on retraction thereof to engage said spreading means tending to cause separation of said punch and stripping members, whereby said stripping member is urged into engagement with a blank in said die block, and means on said slide for engaging and retracting said punch from the blank after withdrawal of said sleeve and while said stripping member is in engagement with the blank.

9. In a cold header, a stationary die block, a reciprocating header slide, a sleeve member slidably mounted in said slide, means to cause said sleeve member to advance over and surround a blank supported in the die block as the header slide advances toward the block, a punch slidable in said sleeve, shoulder means connected with said punch, a stripping member movably mounted in said sleeve, spreading means engaging and movably mounted between said shoulder means and said stripping member and including a forwardly facing abutment portion, a cam support member mounted on said header at a fixed distance from said die block, and cam and cam follower means reacting between said cam support means and said shoulder means, one of said means moving relative to the other as the header slide reciprocates, said cam means being contoured to cause said punch to engage the blank with retraction of said stripping member lagging retraction of said slide during an initial portion of the retract stroke, means on said slide for engaging said sleeve and withdrawing it from the blank with said punch and stripping member held in engagement with the blank by said cam and follower means on said sleeve movable with said header slide on retraction thereof to engage the abutment of said spreading means to urge said stripping member into engagement with a blank in said die block, and simultaneously withdraw said punch from the blank.

10. In a cold header, a frame, a crankshaft rotatable in said frame, a stationary die block, a reciprocating header slide driven by said crankshaft, a punch member slidably mounted in said slide, a stripping member movably mounted in said slide, a cam driven by said crankshaft, cam follower means pivotally mounted on said frame for reacting between said cam and said punch member, resilient means tending to urge said cam follower means against said cam, said cam being contoured to cause retraction of said punch member to lag retraction of said slide during an initial portion of the retract stroke, a contour cam formed on said header slide and second follower means on said cam follower means for engagement with said contour cam, said contour cam and second follower being arranged to control rotation of said cam follower means when it clears said cam upon retraction of the header slide.

11. In a cold header, a bed frame, a reciprocating header slide, cooperating bed frame dies and header slide tools to shape a headed blank, one of said header slide tools comprising a sleeve mounted for limited reciprocating movement with respect to the header slide, a stripping member mounted in said sleeve for limited reciprocating movement with respect to the sleeve, a noncircular punch mounted for movement relative in said stripping member and said sleeve, the outer end of said sleeve comprising a die in alignment with said stripping member, the inner wall of said die being tapered and having its least diameter adjacent the outer end face of the sleeve, means to move said punch with respect to the sleeve to pierce the end of a blank within said tapered die and cause the metal of said end of the blank to extrude along the wall of said tapered die, the taper in said die providing relief of radial pressure on said blank behind the point of penetration of said punch, and means to move said stripping member into said tapered die to remove the blank therefrom.

12. Apparatus for piercing the end of a headed article comprising a bed frame die for holding the shank portion of the article, a reciprocating header slide, a tool carried by the header slide comprising a sleeve, means to move the sleeve relative to the header slide, a stripping member mounted for reciprocation in the sleeve, a noncircular punch mounted for reciprocation in the stripping member movable relative to said sleeve, the outer end of said sleeve including a die in alignment with said stripping tool, the inner wall of said die being tapered and having its least diameter at the end face of the sleeve and arranged to surround the headed end of said article as the header slide approaches said bed frame die, means to move the punch with respect to said stripping member and said tapered die to pierce the blank within the die and extrude the metal thereof along the walls of the tapered die, the taper in said die providing relief of radial pressure on said blank behind the point of penetration of said punch, and means to move the stripping member into said tapered die to eject the blank therefrom.

13. Apparatus for punching a headed article comprising a fixed dieblock for holding the shank portion of the article and a reciprocating header slide, a sleeve member slidably mounted in said header slide, the outer end portion of said sleeve having a die in alignment with and adapted to surround the headed end of the article, the inner wall of said die being tapered and having its smallest diameter adjacent the end face of said sleeve, a noncircular punch mounted for sliding movement within said sleeve, means to move the sleeve toward said fixed die-block and surround the headed end portion of the article, means to move said punch into the headed end of said article after said sleeve is positioned about said headed end of the article, the taper in said die providing relief of radial pressure on said blank behind the point of penetration of said punch, means on said header slide to engage said sleeve and withdraw same from the dieblock on the retraction stroke of said header slide and means on the header slide to effect retraction of the punch after the sleeve is withdrawn.

14. Apparatus for piercing the headed end of a blank comprising a fixed bed frame die for holding the shank portion of a headed blank, a reciprocating header slide, a tool carried by the header slide comprising a sleeve mounted for limited reciprocating movement with respect to the header slide, a bore in said sleeve, a stripping member mounted in said bore for reciprocating movement, the end of said bore adjacent said fixed bed frame die having a tapered section to receive the headed end of the blank as the header slide is advanced toward the blank, said stripping member having a punch mounted for reciprocating movement therein movable relative to said sleeve, means to advance the punch into said tapered section of the sleeve bore to pierce the head of the blank therein and means to advance stripping member with respect to the sleeve and punch to sequentially remove the blank from said sleeve and then from said punch.

References Cited in the file of this patent

UNITED STATES PATENTS

| Number | Name | Date |
|---|---|---|
| 976,758 | Warwick | Nov. 22, 1910 |
| 1,856,027 | Clouse | Apr. 26, 1932 |
| 1,900,572 | Lyman | Mar. 7, 1933 |
| 1,963,320 | Wright | June 19, 1934 |
| 2,038,543 | Clouse | Apr. 28, 1936 |
| 2,093,646 | Purtell | Sept. 21, 1937 |
| 2,165,424 | Tomalis | July 11, 1939 |
| 2,202,324 | Tomalis | May 28, 1940 |
| 2,261,066 | Lovisek | Oct. 28, 1941 |
| 2,261,318 | Wilcox | Nov. 4, 1941 |
| 2,305,049 | Wilcox | Dec. 15, 1942 |
| 2,368,603 | Welsford | Jan. 30, 1945 |
| 2,396,995 | Friedman | Mar. 19, 1946 |
| 2,417,569 | Rice | Mar. 18, 1947 |
| 2,468,998 | Parsons | May 3, 1949 |
| 2,583,270 | Lynall | Jan. 22, 1952 |